United States Patent
Yano

(10) Patent No.: US 9,440,158 B1
(45) Date of Patent: Sep. 13, 2016

(54) SYSTEM AND METHOD FOR PROVIDING SECURED WIRELESS COMMUNICATION WITH AN ACTION FIGURE OR ACTION FIGURE ACCESSORY

(71) Applicant: JUMO, INC., Camden, DE (US)

(72) Inventor: Keiichi Yano, Tokyo (JP)

(73) Assignee: Jumo, Inc., Camden, DE (US)

( * ) Notice: Subject to any disclaimer, the term of this patent is extended or adjusted under 35 U.S.C. 154(b) by 0 days.

(21) Appl. No.: 14/961,040

(22) Filed: Dec. 7, 2015

Related U.S. Application Data

(63) Continuation of application No. 14/636,115, filed on Mar. 2, 2015, now Pat. No. 9,205,336.

(51) Int. Cl.
A63F 13/00 (2014.01)
A63H 3/36 (2006.01)

(52) U.S. Cl.
CPC .................................. *A63H 3/36* (2013.01)

(58) Field of Classification Search
CPC .... A63H 3/28; A63H 2200/00; A63H 13/06; A63H 13/00; A63F 13/00
See application file for complete search history.

(56) References Cited

U.S. PATENT DOCUMENTS

| | | | |
|---|---|---|---|
| 5,766,077 A | 6/1998 | Hongo | 463/30 |
| 6,012,961 A | 1/2000 | Sharpe, III et al. | 446/298 |
| 6,159,101 A | 12/2000 | Simpson | 463/46 |
| 6,290,565 B1 | 9/2001 | Galyean III et al. | 446/99 |
| 6,354,947 B1 | 3/2002 | Dobrusskin et al. | 463/43 |
| 6,773,325 B1 | 8/2004 | Mawle et al. | 446/175 |
| 6,773,344 B1* | 8/2004 | Gabai | A63H 3/28 463/1 |
| 7,066,781 B2 | 6/2006 | Weston | 446/268 |
| 7,502,759 B2 | 3/2009 | Hannigan et al. | 705/51 |
| 7,610,233 B1 | 10/2009 | Leong et al. | 705/37 |
| 7,828,295 B2 | 11/2010 | Matsumoto et al. | 273/238 |
| 7,843,471 B2 | 11/2010 | Doan et al. | 345/633 |
| 7,862,428 B2* | 1/2011 | Borge | A63F 13/02 463/29 |
| 8,257,157 B2 | 9/2012 | Polchin | 463/9 |

(Continued)

FOREIGN PATENT DOCUMENTS

WO 2014/055924 4/2014

OTHER PUBLICATIONS

U.S. Appl. No. 14/645,228, a non-Final Office Action, mailed May 22, 2015, 45 pages.

(Continued)

*Primary Examiner* — Reginald Renwick
(74) *Attorney, Agent, or Firm* — Sheppard Mullin Richter & Hampton LLP

(57) ABSTRACT

In certain implementations, secured communication with an action figure or action figure accessory may be provided. As an example, a device may be detected within a short wireless communication range of the action figure or action figure accessory. A wireless connection may be established between the action figure or action figure accessory and the device based on the detection. A first key may be obtained. First encrypted information may be received from the device via the wireless connection, and processed based on the first key to determine a second key. An identifier associated with the action figure or action figure accessory may be obtained. Second encrypted information may be generated based on the second key and the identifier, and provided to the device via the wireless connection. The second encrypted information may be used to obtain a virtual counterpart of the action figure or action figure accessory.

25 Claims, 5 Drawing Sheets

(56) References Cited

U.S. PATENT DOCUMENTS

| | | | |
|---|---|---|---|
| 8,287,372 B2 | 10/2012 | Hong et al. | 463/34 |
| 8,585,497 B2 | 11/2013 | Borge | 463/29 |
| 8,595,811 B2 | 11/2013 | Johnson et al. | 726/9 |
| 8,602,857 B2 | 12/2013 | Morichau-Beauchant et al. | 463/6 |
| 8,636,588 B2 | 1/2014 | Borge | 463/29 |
| 8,734,242 B2 | 5/2014 | Borge | 463/29 |
| 8,858,339 B2 | 10/2014 | Reiche et al. | 463/42 |
| 9,205,336 B1 | 12/2015 | Yano | |
| 9,259,651 B1 | 2/2016 | Yano | |
| 9,266,027 B1 | 2/2016 | Yano | |
| 9,361,067 B1 | 6/2016 | Yano | |
| 2003/0027636 A1 | 2/2003 | Covannon et al. | 463/42 |
| 2005/0059483 A1 | 3/2005 | Borge | 463/29 |
| 2005/0266920 A1 | 12/2005 | Kaku et al. | 463/31 |
| 2006/0070029 A1 | 3/2006 | Laborczfalvi et al. | 717/120 |
| 2006/0084362 A1 | 4/2006 | Ghaly | 446/484 |
| 2006/0273909 A1 | 12/2006 | Heiman et al. | 340/572.7 |
| 2007/0015588 A1* | 1/2007 | Matsumoto | A63F 13/06 463/43 |
| 2007/0097832 A1 | 5/2007 | Koivisto et al. | 369/63 |
| 2007/0197297 A1 | 8/2007 | Witchey | 463/42 |
| 2008/0081694 A1 | 4/2008 | Hong et al. | 463/34 |
| 2009/0053970 A1 | 2/2009 | Borge | 446/268 |
| 2009/0054155 A1 | 2/2009 | Borge | 463/42 |
| 2009/0098792 A1 | 4/2009 | Cheng et al. | 446/219 |
| 2009/0117819 A1 | 5/2009 | Nakamura | 446/297 |
| 2009/0158210 A1* | 6/2009 | Cheng | G06Q 30/0224 715/810 |
| 2010/0088650 A1 | 4/2010 | Kaltenbach et al. | 715/849 |
| 2010/0151940 A1 | 6/2010 | Borge | 463/29 |
| 2011/0014984 A1 | 1/2011 | Penman et al. | 463/42 |
| 2011/0021109 A1 | 1/2011 | Le et al. | 446/300 |
| 2011/0047600 A1 | 2/2011 | Johnson et al. | 726/4 |
| 2011/0124264 A1 | 5/2011 | Garbos | 446/147 |
| 2012/0191880 A1 | 7/2012 | Gandhi et al. | 710/16 |
| 2012/0295703 A1 | 11/2012 | Reiche et al. | 463/31 |
| 2013/0044570 A1 | 2/2013 | Mkrtchyan | 367/197 |
| 2013/0288563 A1 | 10/2013 | Zheng et al. | 446/268 |
| 2013/0296058 A1 | 11/2013 | Leyland et al. | 463/42 |
| 2013/0307848 A1 | 11/2013 | Tena et al. | 345/420 |
| 2014/0030955 A1 | 1/2014 | Smetanin et al. | 446/268 |
| 2014/0057527 A1 | 2/2014 | Fessenmaier | 446/484 |
| 2014/0088750 A1 | 3/2014 | Sharma et al. | 700/118 |
| 2014/0114630 A1 | 4/2014 | Brave | 703/6 |
| 2014/0121008 A1 | 5/2014 | Canessa | 463/29 |
| 2014/0162785 A1 | 6/2014 | Reiche et al. | 463/35 |
| 2014/0227676 A1 | 8/2014 | Noshadi et al. | 434/365 |
| 2014/0273717 A1 | 9/2014 | Judkins et al. | 446/175 |
| 2014/0273721 A1 | 9/2014 | Katan et al. | 446/268 |
| 2014/0274313 A1 | 9/2014 | Bala et al. | 463/25 |
| 2014/0357373 A1 | 12/2014 | Barney et al. | 463/37 |
| 2015/0038229 A1 | 2/2015 | Reiche et al. | 463/35 |
| 2015/0080121 A1 | 3/2015 | Garlington et al. | 463/31 |
| 2015/0174479 A1 | 6/2015 | Reiche et al. | |
| 2015/0375128 A1 | 12/2015 | Villar et al. | |

OTHER PUBLICATIONS

U.S. Appl. No. 14/622,354, a non-Final Office Action, mailed Jun. 5, 2015, 12 pages.

U.S. Appl. No. 14/622,287, a non-Final Office Action, mailed Jun. 24, 2015, 20 pages.

U.S. Appl. No. 14/622,386, a non-Final Office Action, mailed Jul. 6, 2015, 14 pages.

U.S. Appl. No. 14/622,321, a non-Final Office Action, mailed Jul. 24, 2015, 10 pages.

U.S. Appl. No. 14/645,228, a Final Office Action, mailed Sep. 15, 2015, 28 pages.

U.S. Appl. No. 14/636,115, a Notice of Allowance, mailed Oct. 7, 2015, 9 pages.

U.S. Appl. No. 14/622,386, a Notice of Allowance, mailed Nov. 30, 2015, 9 pages.

U.S. Appl. No. 14/622,354, a Notice of Allowance, mailed Dec. 22, 2015, 10 pages.

U.S. Appl. No. 14/622,321, a non-final Office Action, mailed Jan. 6, 2016, 12 pages.

U.S. Appl. No. 14/622,287, a Final Office Action, mailed Jan. 7, 2016, 18 pages.

U.S. Appl. No. 14/645,228, a Notice of Allowance, mailed Apr. 11, 2016, 20 pages.

U.S. Appl. No. 14/622,287, a non-final Office Action issued, mailed Jun. 20, 2016, 19 pages.

International Patent Application No. PCT/US2016/016303, an International Search Report and Written Opinion mailed Jun. 16, 2016, 16 pages.

\* cited by examiner

SYSTEM AND METHOD FOR PROVIDING SECURED WIRELESS COMMUNICATION WITH AN ACTION FIGURE OR ACTION FIGURE ACCESSORY

CROSS-REFERENCE TO RELATED APPLICATIONS

This application is a continuation of U.S. patent application Ser. No. 14/636,115, filed Mar. 2, 2015 (which issued as U.S. Pat. No. 9,205,336 on Dec. 8, 2015), the content of which is hereby incorporated by reference herein in its entirety. This application is also related to following, co-pending U.S. utility patent applications, filed on Feb. 13, 2015: (1) U.S. patent application Ser. No. 14/622,287, entitled "SYSTEM AND METHOD FOR PRESENTING A VIRTUAL COUNTERPART OF AN ACTION FIGURE BASED ON ACTION FIGURE STATE INFORMATION," (2) U.S. patent application Ser. No. 14/622,321, entitled "SYSTEM AND METHOD FOR PROVIDING STATE INFORMATION OF AN ACTION FIGURE," (3) U.S. patent application Ser. No. 14/622,354, entitled "SYSTEM AND METHOD FOR PROVIDING AN ENHANCED MARKETING, SALE, OR ORDER FULFILLMENT EXPERIENCE RELATED TO ACTION FIGURES OR ACTION FIGURE ACCESSORIES HAVING CORRESPONDING VIRTUAL COUNTERPARTS," and (4) U.S. patent application Ser. No. 14/622,386, entitled "SYSTEM AND METHOD FOR PROVIDING RELEVANT NOTIFICATIONS VIA AN ACTION FIGURE," each of which is hereby incorporated by reference herein in its entirety.

FIELD OF THE INVENTION

The invention relates to providing interactive action figures or action figure accessories that have corresponding virtual counterparts in a virtual environment, and more particularly to a system and method of providing secured wireless communication with an action figure or action figure accessory.

BACKGROUND OF THE INVENTION

In recent years, a number of video game/toy hybrid systems have emerged where figurines of movie, comic, or story characters can "come to life" in a video game. As an example, typical video game/toy hybrid systems enable a player to "import" a character represented by a figurine into the video game by placing the figurine on a portal device attached to a game console. Each game session may require the player to import the character (via the placement of the figurine) to utilize the character to accomplish various tasks in the game during the session. From the perspective of the player, the figurine and the character may become "synonymous" with one another as the player continues to use the figurine to access the character in the video game. As the character grows in-game (e.g., levels up) and obtains new abilities and special powers, the value of the figurine to the player may also increase—further adding to the collectability value of the figurine.

Due to the popularity of hybrid video game/toy systems, counterfeit figurines or other products for such systems are manufactured and sold to take advantage of the superior value of the imitated products, which, in turn, negatively affects the reputation of the imitated products, and reduces profits for companies that design, manufacture, and sell the imitated products. Although some systems may associate unique identifiers with their figurines (or other components) to alleviate counterfeiting issues, the unique identifiers may still be compromised and utilized to create counterfeit versions. These and other drawbacks exist.

SUMMARY OF THE INVENTION

The invention addressing these and other drawbacks relates to methods, apparatuses, or systems for providing secured wireless communication with an action figure or action figure accessory. As used herein, an action figure may comprise a figurine, made of plastic or other materials, having one or more moveable parts (e.g., moveable appendages or other moveable parts) that allow the action figure to exhibit various poses. An action figure accessory may comprise one or more physical objects that modify or supplement the functionality or appearance of an action figure (e.g., to make the action figure more useful, versatile, or attractive, to change the appearance of the action figure, etc.). A virtual environment may comprise a virtual space, a game space, a virtual universe, or other virtual environment.

In accordance with one aspect of the invention, validation of action figures or accessories and encryption of information transmitted from the action figure or accessories may be performed to ensure that the action figures or accessories are valid action figures or accessories. As an example, during a validation process, an action figure may provide one or more of its unique identifier, unique identifiers associated with its accessories, unique identifiers associated with other action figures or accessories, etc., so that the identifiers may be checked against known valid identifiers. To prevent the identifiers from being stolen, the action figure may encrypt the identifiers via one or more techniques described herein, and provide the encrypted versions of the identifiers to validate the action figure, its accessories, other action figures or accessories, etc.

In an implementation, identifiers may be pre-manufactured on silicon components, and the silicon components may be embedded into action figures or accessories with which the identifiers are to be associated. Each silicon component may, for example, carry its own unique fingerprint within its physical structure, e.g., a resulting byproduct of small fabrication errors, which can be used for identification. The unique fingerprint may be read via a contact point and transmitted to a processor of the action figure or accessory (in which the silicon component is embedded) for further processing to validate the action figure or accessory (e.g., encrypting a representation of the unique fingerprint to generate an encrypted version of the identifier that can be provided to validate the action figure or accessory).

In an implementation, an action figure or accessory and another component with which the action figure or accessory is communicating may each generate one or more shared secrets via one or more key exchanges (e.g., public key exchanges, such as Diffie-Hellman key exchange, or other key exchange), and the shared secrets may be utilized to encrypt and decrypt their sent and received information. As an example, an action figure or accessory may encrypt its identifier based on a shared secret generated via a Diffie-Hellman or other key exchange, and provide the encrypted version of the identifier to a validation component to validate the action figure or accessory.

In an implementation, a component (e.g., a validation component or other component communicating with an action figure or accessory) may provide a public key that the action figure or accessory can use to securely send information (e.g., its identifier or other information for validation or other purposes) to the component (e.g., by using the public key to encrypt the information prior to sending). As an example, the public key provided by the component may comprise a RSA-based encryption key. As such, even though the public key may be utilized as an encryption key to encrypt information to be sent to the component (e.g., a validation component), the public key cannot be used by another party to decrypt the encrypted information. On the other hand, the component (which provided the public key) may decrypt the encrypted information because of its knowledge of the prime numbers used to generate the public encryption key. In another implementation, the action figure or accessory may provide a public key that other components can use to securely send information to the action figure or accessory. As an example, the public key provided by the action figure or accessory may comprise a RSA-based encryption key that can be used to encrypt information, but cannot be used as a decryption key to decrypt to the encrypted information. However, because of its knowledge of the prime numbers used to generate the public encryption key, the action figure or accessory can decrypt encrypted information that was encrypted using the public encryption key.

In an implementation, an action figure or accessory may utilize a private key from a set of private keys stored at the action figure or accessory to encrypt information or to provide as an additional level of validation. The set of private keys may comprise one or more shared secrets (generated via a Diffie-Hellman or other key exchange) or other private keys. A host of a virtual environment (in which a virtual counterpart of the action figure or accessory exists) may, for example, provide or update the set of private keys to/for the action figure or accessory. A virtual environment host may comprise one or more virtual universe servers, game servers, or other components that host the virtual environment (e.g., a virtual space, a game space, a virtual universe, or other virtual environment).

In one implementation, a private key from the set of private keys (stored at the action figure or accessory) may be provided along with the identifier associated with the action figure or accessory for validation. Upon receipt of the private key and the identifier, a validation component may, for example, check both the identifier and the private key against a database that contains valid identifiers and the set of private keys to determine whether the action figure or accessory is a valid action figure or accessory. In this way, the use of the private key as a validation check may provide an additional level of validation. As an example, even if the action figure or accessory's identifier is compromised, a given action figure or accessory may not be validated without going through the additional validation check based on the set of private keys (e.g., which can be provided and updated by a component performing such validation checks).

In another implementation, a private key from the set of private keys (stored at the action figure or accessory) may be utilized to encrypt the identifier associated with the action figure or accessory. As an example, the action figure or accessory may utilize a shared secret (generated via a Diffie-Hellman or other key exchange) and the private key to encrypt the identifier, and the shared secret to encrypt the private key. Upon receipt of the encrypted versions of the identifier and the private key, a validation component may decrypt the encrypted version of the identifier using the shared secret and the private key, and decrypt the encrypted version of the private key using the shared secret. The validation component may then check the identifier and the private key against a database that contains valid identifiers and the set of private keys to determine whether the action figure or accessory is a valid action figure or accessory.

As another example, the action figure or accessory may utilize a RSA-based public encryption key and the private key to encrypt the identifier, and the RSA-based public encryption key to encrypt the private key. Upon receipt of the encrypted versions of the identifier and the private key, a validation component may decrypt the encrypted version of the identifier using a RSA-based decryption key (corresponding to RSA-based public encryption key) and the private key, and decrypt the encrypted version of the private key using the RSA-based decryption key. The validation component may then check the identifier and the private key against a database that contains valid identifiers and the set of private keys to determine whether the action figure or accessory is a valid action figure or accessory.

It should be noted that, although implementations described herein are with respect to action figures and action figure accessories, it is understood that (to the extent possible) other objects may be used in place of action figures and/or action figure accessories. As an example, in an implementation, a host of a virtual environment (in which a virtual counterpart of a real-world object exists) may participate in a Diffie-Hellman or other key exchange with the real-world object so that the virtual environment host (or a key management or validation component thereof) and the real-world object may each have a copy of the shared secret generated based on the key exchange that can be utilized to encrypt information, to validate the real-world object, or for other purposes.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
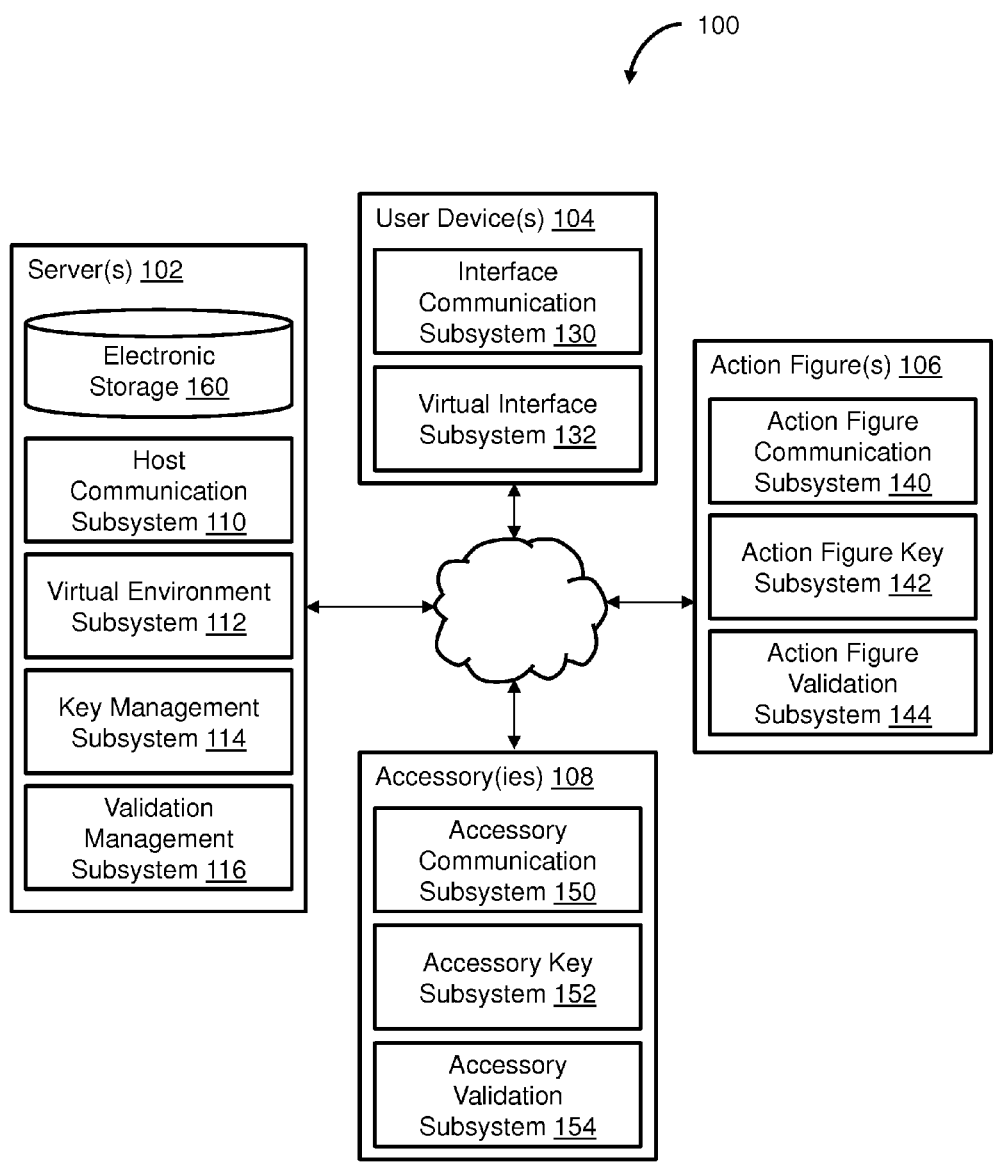
FIG. 1 is an exemplary illustration of a system for providing secured wireless communication with an action figure or action figure accessory, in accordance with an aspect of the invention.

FIG. 1 is an exemplary illustration of a system 100 for providing secured wireless communication with an action figure or action figure accessory, in accordance with an aspect of the invention. As shown in FIG. 1, system 100 may comprise server 102 (or multiple servers 102). Server 102 may comprise host communication subsystem 110, virtual environment subsystem 112, key management subsystem 114, validation management subsystem 116, or other components.

System 100 may further comprise a user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102, other user devices 104, action figures 106, action figure accessories 108, or other components of system 100.

User device 104 may comprise interface communication subsystem 130, virtual interface subsystem 132, or other components. It should be noted that while one or more operations are described herein as being performed by components of one of server 102 or user device 104, those operations may, in some implementations, be performed by components of the other one of service 102 or user device 104.

Action figure 106 may comprise action figure communication subsystem 140, action figure key subsystem 142, action figure validation subsystem 144, or other components. Action figure accessory 108 may comprise accessory communication subsystem 150, accessory key subsystem 152, accessory validation subsystem 154, or other components. It should be noted that, while one or more operations are described herein as being performed by components of one of action figure 106 or action figure accessory 108, those operations may, in some implementations, be performed by components of the other one of action figure 106 or action figure accessory 108.

In some implementations, user device 104 may act as an intermediary between server 102, action figure 106, and/or accessory 108. As an example, information may be provided from server 102 to action figure 106 or accessory 108 via virtual interface subsystem 132 of user device 104, and information may be provided from action figure 106 or accessory 108 to server 102 via virtual interface subsystem 132 of user device 104. In other implementations, server 102, action figure 106, and/or accessory 108 may receive information from or transmit information to one another without the need for user device 104 through one or more wired or wireless means. As such, although some implementations are described herein with respect to the use of user device 104 (or virtual interface subsystem 132) as an intermediary between server 102, action figure 106, and/or accessory 108, it is understood that (to the extent possible) receipt and transmission of information between server 102, action figure 106, and/or accessory 108 may be performed without the need for user device 104 as an intermediary.

In some implementations, the various computers and subsystems illustrated in FIG. 1 may comprise one or more computing devices that are programmed to perform the functions described herein. The computing devices may include one or more electronic storages (e.g., electronic storage 160, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 110-154 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-154 described herein is for illustrative purposes, and is not intended to be limiting, as any of subsystems 110-154 may provide more or less functionality than is described. For example, one or more of subsystems 110-154 may be eliminated, and some or all of its functionality may be provided by other ones of subsystems 110-154. As another example, additional subsystems may be programmed to perform some or all of the functionality attributed herein to one of subsystems 110-154.

Attention will now be turned to a more detailed description of various implementations comprising one or more features related to providing interactive action figures and/or action figure accessories that have corresponding virtual counterparts in a virtual environment. It should be noted that features described herein may be implemented separately or in combination with one another.

Virtual Counterpart Presentation Based on Action Figure or Accessory Information In an implementation, action figure information obtained from an action figure may be utilized to present a virtual counterpart of the action figure in a virtual environment in which virtual counterparts of action figures interact with one another or with the virtual environment. In an implementation, action figure or accessory information may be obtained from one or more action figures or accessories. The action figure or accessory information may then be utilized to present virtual counterparts of the action figures or accessories in the virtual environment. In some implementations, presentation of virtual counterparts based on action figure or accessory information may be provided in accordance with implementations described in related co-pending U.S. patent application Ser. No. 14/622,287, entitled "SYSTEM AND METHOD FOR PRESENTING A VIRTUAL COUNTERPART OF AN ACTION FIGURE BASED ON ACTION FIGURE STATE INFORMATION," which is hereby incorporated by reference in its entirety.

In an implementation, interface communication subsystem 130 may detect action figure 106 within a short wireless communication range of user device 104. Based on the detection of action figure 106, interface communication subsystem 130 may establish a wireless connection between user device 104 and action figure 106. Additionally, or alternatively, interface communication subsystem 130 may detect one or more accessories 108, other action figures 106, or other objects within a short wireless communication range of user device 104, and establish respective wireless connections with the detected objects.

As an example, if interface communication subsystem 130 enables wireless communication between user device 104 and the other object (e.g., action figure 106, accessory 108, etc.) via NFC technology, the other object may need to be within an NFC communication range in order for the other object to be detected and an NFC communication session to be established between user device 104 and the other object. As another example, if interface communication subsystem 130 enables wireless communication between user device 104 and the other object via Bluetooth technology, the other object may need to be within a Bluetooth communication range in order for the other object to be detected and a Bluetooth communication session to be established between user device 104 and the other object. As yet another example, if interface communication subsystem 130 enables wireless communication between user device 104 and the other object via Wi-Fi technology, the other object may need to be within a Wi-Fi communication range in order for the other object to be detected and a Wi-Fi communication session to be established between user device 104 and the other object.

Figure 2A:
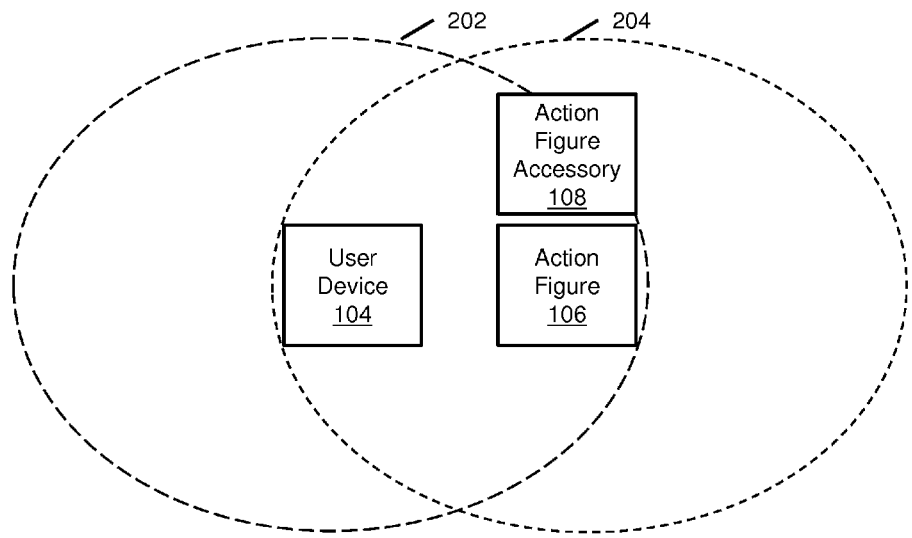
FIGS. 2A and 2B are exemplary illustrations of scenarios in which user devices, action figures, or action figure accessories communicate with one another via a short-range wireless connection, in accordance with aspects of the invention.

In one scenario, as shown in FIG. 2A, objects within area 202 may be within a wireless communication range of user device 104, and objects within area 204 may be within a wireless communication range of action figure 106. In the scenario of FIG. 2A, user device 104 and action figure 106 may establish a wireless connection with one another through which the two devices may directly communicate with one another. Additionally, or alternatively, user device 104 and accessory 108 may establish a wireless connection with one another through which the two devices may directly communicate with one another.

In another scenario, accessory 108 may provide information to user device 104 (or to a host of an associated virtual environment) by transmitting the information to action figure 106 via a wireless connection established between action figure 106 and accessory 108. Upon receipt of the information, action figure 106 may transmit the information to user device 104 via a wireless connection established between user device 104 and action figure 106. Accessory 108 may also receive information from user device 104 through action figure 106. In yet another other scenario, the roles of action figure 106 and accessory 108 may be swapped such that user device 104 and accessory 108 may be within each other's respective wireless communication ranges, and accessory 108 may relay information from action figure 106 to user device 104 or from user device 104 to action figure 106.

In yet another scenario, one or more action figures 106 may act as intermediaries between (i) one or more other action figures 106 (or their accessories 108) and (ii) user device 104 (or a host of an associated virtual environment). As an example, user device 104 may not support enough wireless connections at a given time. As such, one or more action figures 106 may act as intermediaries to limit the number of wireless connections with user device 104. If, for example, an "army" of action figure 106 is used during gameplay, one or more action figures 106 may act as intermediaries and establish wireless connections with user device 104 and other action figures 106. Thus, the receipt and transmission to/from the other action figures 106 may be performed through the intermediary action figures 106.

Figure 2B:
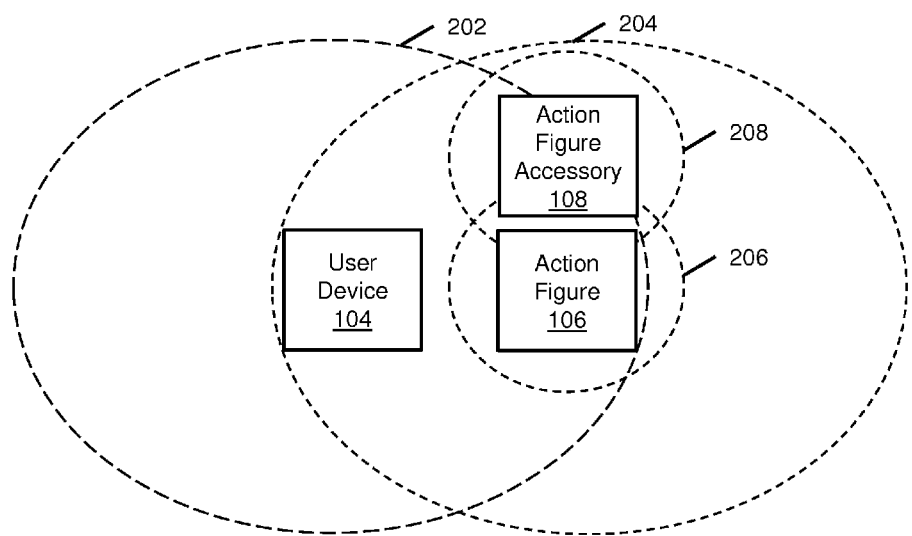

In a further scenario, with respect to FIG. 2B, area 202 may correspond to a Bluetooth communication range of user device 104, and area 204 may correspond to a Bluetooth communication range of action figure 106. Area 206 may correspond to an NFC communication range of action figure 106, and area 208 may correspond to an NFC communication range of accessory 108. As an example, user device 104 and action figure 106 may establish a Bluetooth communication session with one another through which the two devices may directly communicate with one another. Action figure 106 and accessory 108 may establish an NFC communication session with one another through which the two devices may directly communicate with one another.

It should be noted that, although some implementations described herein are with respect to wireless communications between one or more components of system 100, it is understood that (to the extent possible) communications between the components of system 100 may be performed via one or more wired means. For example, server 102, user device 104, action figure 106, accessory 108, or other components of system 100 may be directly connected to one another via a Universal Serial Bus (USB) connection, an Ethernet connection, or other wired means.

In an implementation, virtual interface subsystem 132 may provide action figure or accessory information (received from one or more action figures or accessories) to virtual environment subsystem 112. Virtual environment subsystem 112 may generate a presentation of one or more virtual counterparts of the action figures or accessories in a virtual environment, and provide the presentation of the virtual counterparts and the virtual environment to virtual interface subsystem 132. Responsive to receiving the presentation, virtual interface subsystem 132 may provide the presentation of the virtual counterparts and the virtual environment to a user of user device 104 (e.g., via a display electronically coupled to user device 104, via a speaker electronically coupled to user device 104, or other output device).

Secured Communication With Action Figures/Accessories

In an implementation, action figures or accessories may utilize one or more keys (e.g., a private key, a public key, a shared secret, etc.) to encrypt information so that the information can be securely provided to one another, a server, or other device. As an example, action figures or accessories may be validated from time to time to ensure that a valid action figure or accessory is being used without tampering. Validation of the action figures or accessories may comprise validation of identifiers associated with the action figures or accessories. During a validation process, for example, an action figure may provide one or more of its identifier, identifiers associated with its accessories, identifiers associated with other action figures or accessories, etc., so that the identifiers may be checked against known valid identifiers. To prevent the identifiers from being stolen, the action figure may encrypt the identifiers via one or more techniques described herein, and provide the encrypted versions of the identifiers to validate the action figure, its accessories, other action figures or accessories, etc.

In an implementation, identifiers may be pre-manufactured on silicon components, and the silicon components may be embedded into action figures or accessories with which the identifiers are to be associated. As an example, rather than having an identifier stored in traditional memory, each silicon component may carry its own unique fingerprint within its physical structure, e.g., a resulting byproduct of small fabrication errors, which can be used for identification. The unique fingerprint may, for instance, be read via a contact point and transmitted to a processor of the action figure or accessory (in which the silicon component is embedded) for further processing to validate the action figure or accessory (e.g., encrypting a representation of the unique fingerprint to generate an encrypted version of the identifier that can be provided to validate the action figure or accessory). In another implementation, an identifier associated with an action figure or accessory may be stored in a non-volatile memory of the action figure or accessory (e.g., flash memory or other non-volatile memory), and the stored identifier may be retrieved when needed for validation or other purposes.

In an implementation, action figure 106 and server 102 may participate in a public key exchange, such as a Diffie-Hellman key exchange or other key exchange. As an example, action figure 106 may provide a public key associated with a public-private key pair to server 102, and obtain a public key from server 102. Action figure 106 may utilize the public key obtained from server 102 and a private key associated with the public-private key pair to generate a shared secret (e.g., a private key known only to action figure 106 and server 102). Server 102 may utilize the public key that action figure 106 provided and a private key (associated with the same public-private key pair as the public key that action figure 106 obtained from server 102) to generate the shared secret. As such, action figure 106 and server 102 are each able to generate a common secret to encrypt and decrypt their sent and received information (e.g., action figure or accessory identifiers, action figure or accessory information, new keys, or other information) without transmitting the private keys associated with their respective public-private key pairs or the shared secret to one another. Authentication of the communicating parties (e.g., action figure 106, server 102, etc.) may also be performed to alleviate other securities issues (e.g., by utilizing a cryptographic key agreement scheme that provides mutual key and entity authentication).

It should be noted that while one or more operations are described herein as being performed by components of server 102, those operations may, in some implementations, be performed by components of user device 104. It should also be noted that while one or more operations are described herein as being performed by components of action figure 106, those operations may, in some implementations, be performed by components of action figure accessory 108. As an example, accessory 108 and server 102 may participate in a public key exchange with one another so that each may securely generate a shared secret that they can utilize to encrypt and decrypt information sent and received to/from one another. As another example, action figure 106 and user device 104 may participate in a public key exchange with one another so that each may securely generate a shared secret that they can utilize to encrypt and decrypt information sent and received to/from one another. As a further example, accessory 108 and user device 104 may participate in a public key exchange with one another so that each may securely generate a shared secret that they can utilize to encrypt and decrypt information sent and received to/from one another. As yet another example, action figure 106 and accessory 108 may participate in a public key exchange with one another so that each may securely generate a shared secret that they can utilize to encrypt and decrypt information sent and received to/from one another.

In an implementation, action figure 106 may utilize a shared secret (generated via a public key exchange with server 102) to encrypt its identifier, identifiers associated with its accessories 108, identifiers associated with other action figures 106 or accessories 108, or other information (e.g., action figure information, accessory information, etc.). Action figure 106 may provide the encrypted information to server 102 to validate itself, its accessories 108, or other action figures 106 or accessories 108. As an example, action figure key subsystem 142 and key management subsystem 114 may participate in a public key exchange to generate the shared secret at action figure 106 and server 102, respectively. Upon a request from server 102 for validation information for action figure 106, action figure validation subsystem 144 may work with action figure key subsystem 142 to encrypt the identifier associated with action figure 106 based on the shared secret, and provide the encrypted identifier to validation management subsystem 116 for further processing. Validation management subsystem 116 may, for instance, work with key management subsystem 114 to decrypt the encrypted identifier based on the shared secret to determine the identifier associated with action figure 106. Validation management subsystem 116 may then check the identifier against a database of valid identifiers to determine whether action figure 106 is a valid action figure.

In an implementation, action figure 106 may utilize a public key (e.g., an RSA-based public encryption key generated and provided by server 102) to encrypt its identifiers, identifiers associated with its accessories 108, identifiers associated with other action figures 106 or accessories 108, or other information (e.g., action figure information, accessory information, etc.). Action figure 106 may provide the encrypted information to server 102 to validate itself, its accessories 108, or other action figures 106 or accessories 108. As an example, key management subsystem 114 may generate a public encryption key based on large prime numbers (e.g., known only to key management subsystem 114), and provide the public encryption key to action figure 106 to use to encrypt information to be sent to server 102 for validation or other purposes. Upon a request from server 102 for validation information for action figure 106, action figure validation subsystem 144 may work with action figure key subsystem 142 to encrypt the identifier associated with action figure 106 based on the public encryption key (provided by key management subsystem 114), and provide the encrypted identifier to validation management subsystem 116 for further processing. Validation management subsystem 116 may, for instance, work with key management subsystem 114 to decrypt the encrypted identifier to determine the identifier associated with action figure 106. Key management subsystem 114 may, for example, utilize the large prime numbers used to generate the public encryption key to decrypt the encrypted identifier (e.g., based on a reverse key algorithm). Validation management subsystem 116 may then check the identifier against a database of valid identifiers to determine whether action figure 106 is a valid action figure.

In an implementation, action figure 106 may utilize a private key from a set of private keys (stored at action figure 106) to encrypt its identifier or other information (e.g., other identifiers, action figure or accessory information, etc.). As an example, action figure key subsystem 142 may utilize the private key (from the set of private keys) and a shared secret (generated via a public key exchange with server 102) to encrypt an identifier or other information so that an encrypted version of the identifier (or other information) may be securely provided to one or more other components (e.g., for validation or other purposes). As another example, action figure key subsystem 142 may utilize the private key (from the set of private keys) and a public encryption key (e.g., RSA-based public encryption key) to encryption the identifier or other information that may be sent to one or more other components (e.g., for validation or other purposes).

In an implementation, a private key from a set of private keys (stored at action figure 106) may be utilized to validate action figure 106. As an example, action figure 106 may obtain the private key from the set of private keys and generate an encrypted version of the private key (e.g., by encrypting the private key with a shared secret generated via a public key exchange, by encryption the private key with a RSA-based public encryption key, etc.). Action figure 106 may provide the encrypted version of the private key to server 102. Server 102 may decrypt the encrypted version (provided from action figure 106) to determine the private key, and check the private key against a copy of the set of private keys at server 102. In a further implementation, the private key (from the set of private keys stored at action figure 106) may be utilized as an additional level of validation to ensure that action figure 106 is a valid action figure. As an example, an encrypted version of an identifier associated with action figure 106 and the encrypted version of the private key may be provided to server 102. Server 102 may check both the identifier and the private key against a database that contains valid identifiers and the set of private keys to determine whether action figure 106 is a valid action figure.

In an implementation, server 102 (e.g., key management subsystem 114 thereof) may update a set of private keys stored at action figure 106 so that one or more new private keys may replace one or more old private keys in the stored private key set. As an example, server 102 may update the set of private keys stored at action figure 106 by providing one or more new private keys to replace one or more old private keys in the private key set. Server 102 may, for instance, encrypt new private keys that are to be used by action figure 106 (e.g., for encryption, validation, or other purposes) and provide the encrypted version of the new private keys to action figure 106. Upon receipt, action figure 106 (e.g., action figure key subsystem 142 thereof) may decrypt the encrypted versions to determine the new private keys and update the stored private key set. A copy of the set of private keys at server 102 may also be updated to reflect the updated private key set stored at action figure 106.

As another example, server 102 may update the set of private keys stored at action figure 106 by participating in one or more public key exchanges so that (i) action figure 106 may utilize public keys obtained from server 102 to generate shared secrets and (ii) server 102 may utilize public keys obtained from action figure 106 to generate the same shared secrets. Each of action figure 106 and server 102 may then update their respective copies of the set of private keys (e.g., that are used for encryption, validation, or other purposes) by replacing one or more old private keys with the newly generated shared secrets.

In an implementation, the private keys of a set of private keys used for encryption, validation, or other purposes may be updated based on one or more time intervals, one or more usage intervals, or other intervals (e.g., without regard to whether one or more private keys have been compromised). As an example, the set of private keys stored at action figure 106 (or the corresponding copy of the set of private keys stored at server 102) may be updated based on a predetermined periodic time interval (e.g., on a monthly, weekly, hourly, or other periodic basis). As another example, individual ones of the private keys of the set of private keys may be replaced or otherwise discarded after a predetermined number of uses. In one use case, for instance, a private key may be used a predetermined threshold number of times (e.g., once, twice, ten times, or other predetermined threshold number of times) before the private key is replaced with a new private key or removed from the set of private keys that can be used for encryption, validation, or other purposes. In this way, even if one of the private keys is compromised, it will be replaced with a new private key or removed from the valid set of private keys that can be used for encryption, validation, or other purposes.

Exemplary Data Flow

Figure 3:
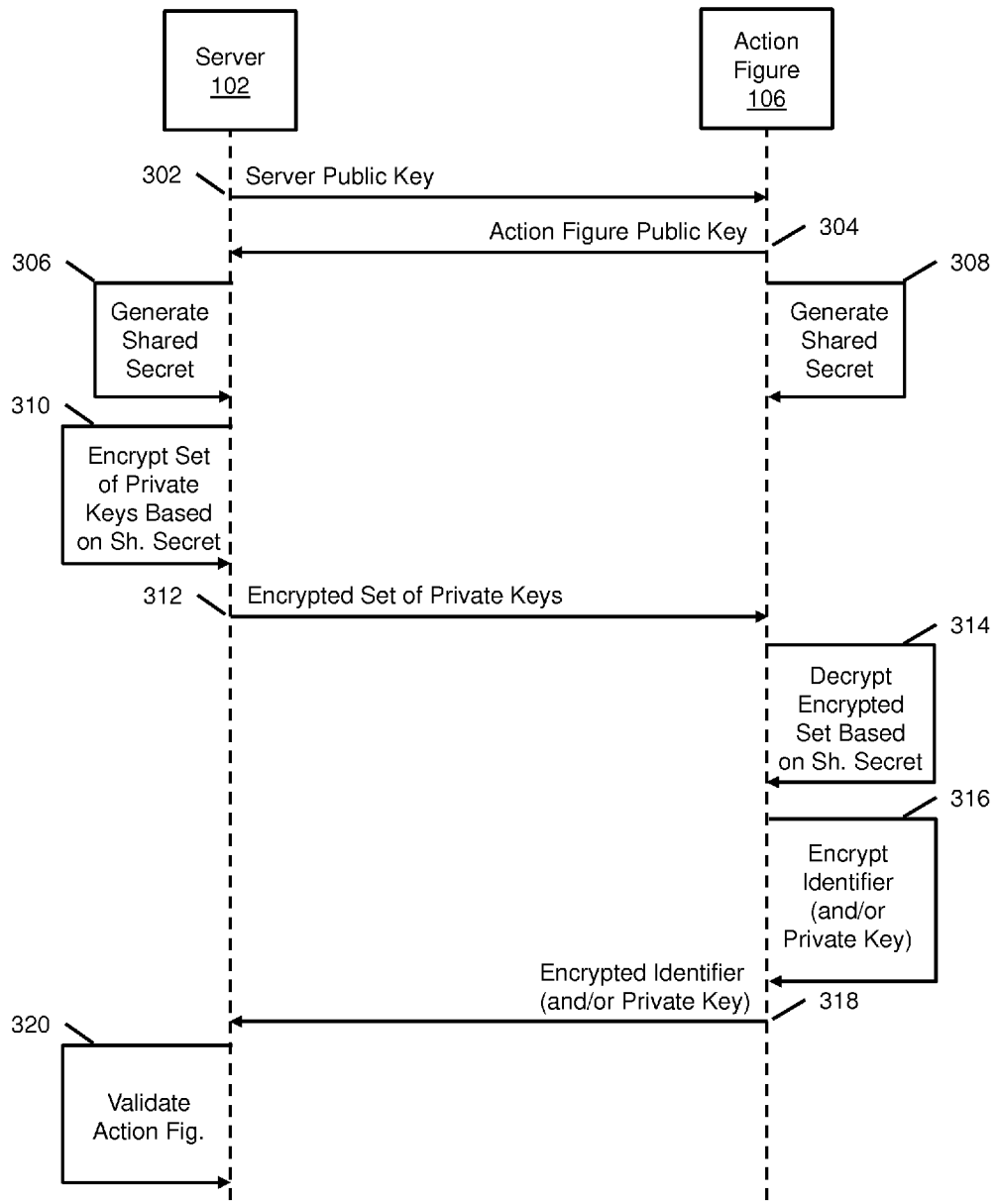
FIG. 3 is an exemplary illustration of a data flow related to providing secured wireless communication with an action figure or action figure accessory, in accordance with an aspect of the invention.

FIG. 3 is an exemplary illustration of a data flow related to providing secured wireless communication with an action figure or action figure accessory, in accordance with an aspect of the invention. As an example, in operations 302-308, server 102 and action figure 106 may participate in a Diffie-Hellman or other key exchange with one another so that server 102 and action figure 106 may each securely generate a copy of a shared secret that can be used for encryption, validation, or other purposes.

Server 102 may obtain a set of private keys that is to be used by action figure 106 for encryption, validation, or other purposes. As shown, in operations 310 and 312, server 102 may encrypt the set of private keys based on the shared secret, and provide the encrypted set of private keys to action figure 106. In operation 314, action figure 106 may decrypt the encrypted set of private keys based on the shared secret, and store the set of private keys for later use. In some implementations, server 102 and action figure 106 may participate in one or more Diffie-Hellman or other key exchanges so that server 102 and action figure 106 may each securely generate copies of shared secrets to be included as private keys in the set of private keys.

In operations 316 and 318, action figure 106 may encrypt its associated identifier (or other information), and provide the encrypted version of the identifier to server 102. The identifier may, for example, be encrypted based on the shared secret and/or a private key from the set of private keys (e.g., obtained from server 102, generated via one or more key exchanges, etc.). As indicated, in operations 316 and 318, action figure 106 may encrypt the private key from the set of private keys, and provide the encrypted version of the private key to server 102.

It should be noted that, while operations 302-318 are described with respect to use of a shared secret generated via a Diffie-Hellman or other key exchange, other cryptographic techniques may be utilized. As an example, action figure 106 may generate a public encryption key (e.g., a RSA-based public encryption key or other public encryption key) that can be used by others to encrypt information, but cannot be used by others as a decryption key to decrypt information encrypted using the public encryption key. Action figure 106 may provide the public encryption key to server 102. Server 102 may obtain and encrypt a set of private keys (that is to be used by action figure 106 for encryption, validation, or other purposes) using the public encryption key provided by action figure 106, and provide the encrypted set of private keys to action figure 106. Upon receipt, action figure 106 may decrypt the encrypted set of private keys using a private decryption key corresponding to the public encryption key. If, for instance, action figure 106 utilized two large prime numbers to generate the public encryption key, it may also utilize the same two large prime numbers to generate the private decryption key (that it can then use to decrypt information encrypted with the public encryption key).

As another example, server 102 may generate a public encryption key (e.g., a RSA-based public encryption key or other public encryption key) that can be used by others to encrypt information, but cannot be used by others as a decryption key to decrypt information encrypted using the public encryption key. Server 102 may provide the public encryption key to action figure 106, and action figure 106 may utilize the public encryption key to encrypt its associated identifier (or other information) that is to be provided to server 102 for validation or other purposes. Action figure 106 may, for instance, encrypt the identifier based on the public encryption key and/or a private key from the set of private keys (e.g., obtained from server 102, generated via one or more key exchanges, etc.).

In operation 320, server 102 may decrypt the encrypted versions of the identifier and/or the private key, and utilize the identifier and/or the private key to validate action figure 106 by checking both the identifier and the private key against a database that contains valid identifiers and the set of private keys to determine whether action figure 106 is a valid action figure. As an example, if action figure 106 is determined to be a valid action figure, server 102 may enable or continue to allow action figure 106 to be used to control or manipulate a virtual counterpart of action figure 106 in a virtual environment.

It should be noted that, while one or more operations are described herein (e.g., operations 302-320 or other operations) as being performed by server 102, those operations may, in some implementations, be performed by user device 104. It should also be noted that while one or more operations are described herein as being performed by action figure 106, those operations may, in some implementations, be performed by action figure accessory 108.

Exemplary Flowcharts

Figure 4:
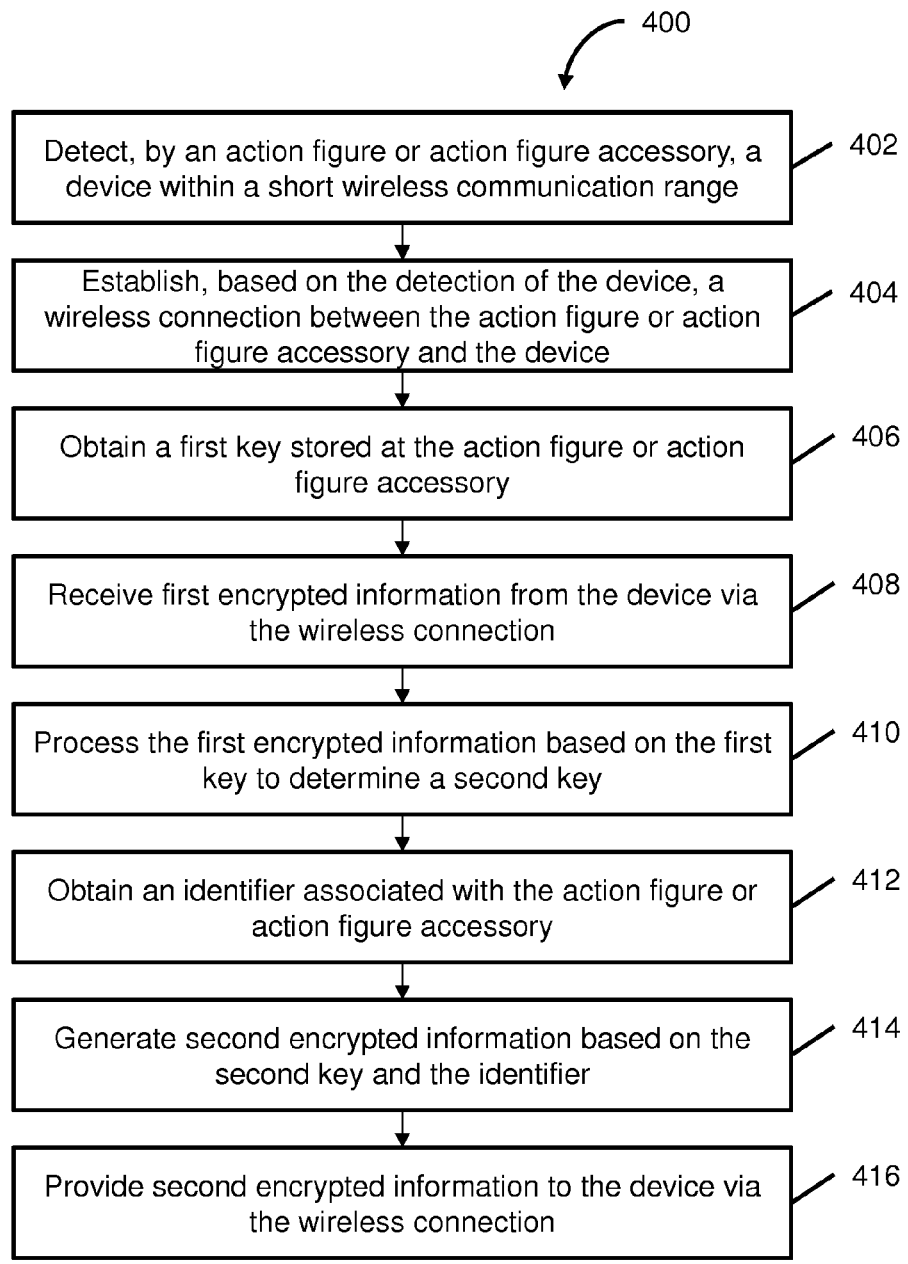
FIGS. 4 and 5 are exemplary illustrations of flowcharts of methods for providing secured wireless communication with an action figure or action figure accessory, in accordance with aspects of the invention.
Figure 5:
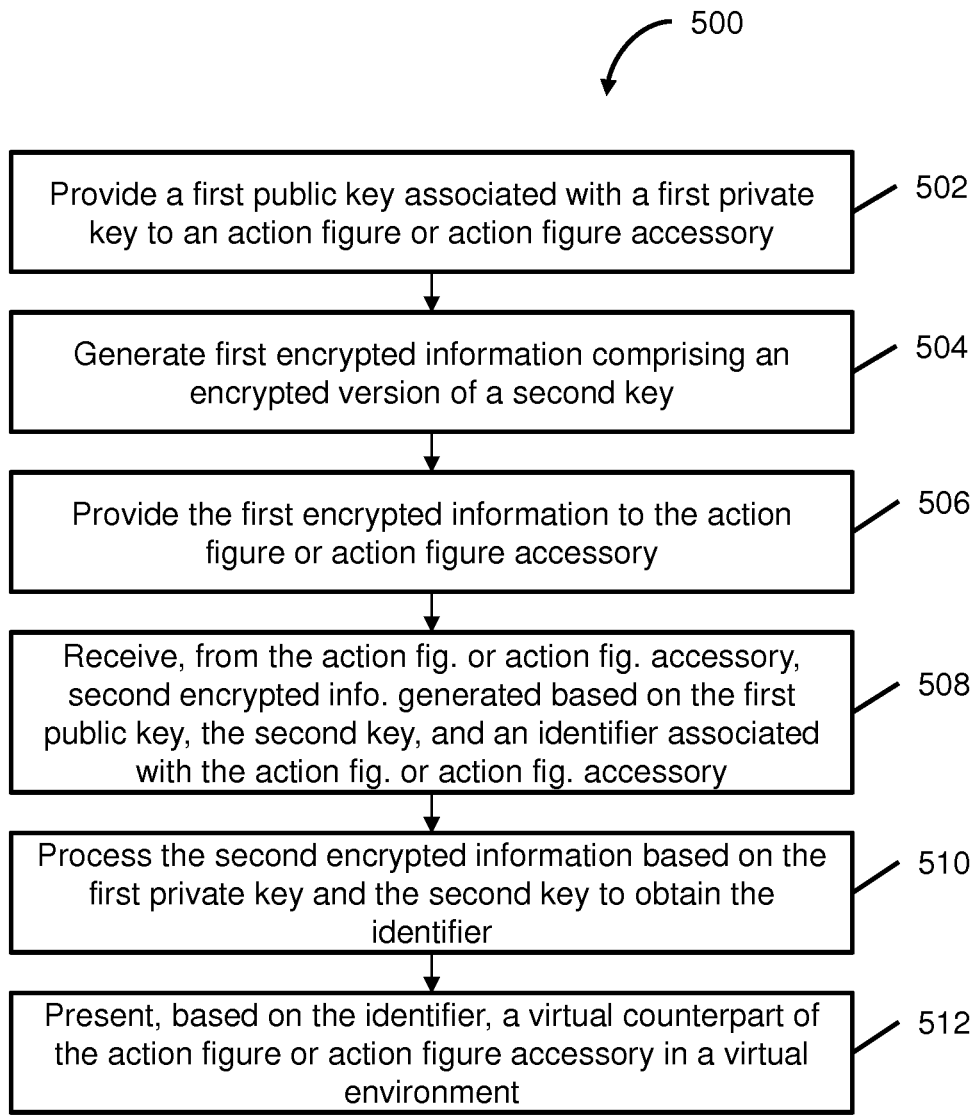

FIGS. 4 and 5 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 4 is an exemplary illustration of a flowchart of a method 400 of providing secured wireless communication with an action figure or action figure accessory, in accordance with an aspect of the invention.

In an operation 402, a device may be detected within a short wireless communication range of an action figure or action figure accessory. Operation 402 may be performed by a communication subsystem that is the same as or similar to action figure communication subsystem 140 or accessory communication subsystem 150, in accordance with one or more implementations.

In an operation 404, a wireless connection between the action figure or action figure accessory and the device may be established based on the detection. Operation 404 may be performed by a communication subsystem that is the same as or similar to action figure communication subsystem 140 or accessory communication subsystem 150, in accordance with one or more implementations.

In an operation 406, a first key stored at the action figure or action figure accessory may be obtained. As an example, the first key may comprise a first private key. As another example, the first private key may comprise a shared secret generated via a Diffie-Hellman or other key exchange, a private decryption key (e.g., generated via RSA-based techniques), or a private key obtained via another technique. Operation 406 may be performed by a key subsystem that is the same as or similar to action figure key subsystem 142 or accessory key subsystem 152, in accordance with one or more implementations.

In an operation 408, first encrypted information may be received from the device via the wireless connection. As an example, the first encrypted information may comprise an encrypted version of a second key that is to be used by the action figure or action figure accessory for encryption, validation, or other purposes. Operation 408 may be performed by a key subsystem that is the same as or similar to action figure key subsystem 142 or accessory key subsystem 152, in accordance with one or more implementations.

In an operation 410, the first encrypted information may be processed based on the first key (e.g., a shared secret or other key) to determine the second key. As an example, the second key may comprise a second private key. Operation 410 may be performed by a key subsystem that is the same as or similar to action figure key subsystem 142 or accessory key subsystem 152, in accordance with one or more implementations.

In an operation 412, an identifier associated with the action figure or action figure accessory may be obtained. Operation 412 may be performed by a validation subsystem that is the same as or similar to action figure validation subsystem 144 or accessory validation subsystem 154, in accordance with one or more implementations.

In an operation 414, second encrypted information may be generated based on the second key and the identifier. As an example, the second encrypted information may comprise an encrypted version of the identifier. Operation 414 may be performed by a key subsystem that is the same as or similar to action figure key subsystem 142 or accessory key subsystem 152, in accordance with one or more implementations.

In an operation 416, the second encrypted information may be provided to the device via the wireless connection. Operation 416 may be performed by a validation subsystem that is the same as or similar to action figure validation subsystem 144 or accessory validation subsystem 154, in accordance with one or more implementations.

FIG. 5 is an exemplary illustration of a flowchart of a method 500 of providing secured wireless communication with an action figure or action figure accessory, in accordance with an aspect of the invention.

In an operation 502, a first public key associated with a first private key may be provided to an action figure or action figure accessory. As an example, the first public key may comprise (i) a public key to be used to generate a shared secret, (ii) a public encryption key (e.g., a RSA-based public encryption key or other public encryption key) to be used by others to encrypt (but not decrypt) information, or (iii) other public key. Operation 502 may be performed by a key subsystem that is the same as or similar to key management subsystem 114, in accordance with one or more implementations.

In an operation 504, first encrypted information comprising an encrypted version of a second key may be generated. As an example, the second key may comprise a second private key. The second private key may be encrypted via one or more techniques described here to generate the first encrypted information. Operation 504 may be performed by a key subsystem that is the same as or similar to key management subsystem 114, in accordance with one or more implementations.

In an operation 506, the first encrypted information may be provided to the action figure or action figure accessory. Operation 506 may be performed by a key subsystem that is the same as or similar to key management subsystem 114, in accordance with one or more implementations.

In an operation 508, second encrypted information may be received from the action figure or action figure accessory. As an example, the second encrypted information may be generated at the action figure or action figure accessory based on the first public key, the second key, and an identifier associated with the action figure or action figure accessory. Upon generation, the second encrypted information may comprise an encrypted version of the identifier. The generated second encrypted information may be received from the action figure or action figure accessory. Operation 508 may be performed by a validation subsystem that is the same as or similar to validation management subsystem 116, in accordance with one or more implementations.

In an operation 510, the second encrypted information may be processed based on the first private key and the second key to obtain the identifier. Operation 510 may be performed by a validation subsystem that is the same as or similar to validation management subsystem 116, in accordance with one or more implementations.

In an operation 512, a virtual counterpart of the action figure or action figure accessory in a virtual environment may be presented based on the identifier. Operation 512 may be performed by a virtual environment subsystem that is the same as or similar to virtual environment subsystem 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A method of providing secured wireless communication with an action figure or action figure accessory, the method being implemented on the action figure or action figure accessory that includes one or more physical processors executing computer program instructions which, when executed, perform the method, the method comprising:
   detecting, by the action figure or action figure accessory, a device within a short wireless communication range;
   establishing, by the action figure or action figure accessory, based on the detection, a wireless connection between the action figure or action figure accessory and the device;
   obtaining, by the action figure or action figure accessory, a first key;
   receiving, at the action figure or action figure accessory, first encrypted information from the device via the established wireless connection, wherein the first encrypted information comprises an encrypted version of a second key;
   processing, by the action figure or action figure accessory, the first encrypted information based on the first key to determine the second key;
   generating, by the action figure or action figure accessory, second encrypted information based on the second key and an identifier associated with the action figure or action figure accessory; and
   providing, by the action figure or action figure accessory, the second encrypted information to the device via the established wireless connection.

2. The method of claim 1, wherein the action figure or action figure accessory comprises an action figure, and the identifier comprises an identifier associated with the action figure, and
   wherein generating the second encrypted information comprises generating the second encrypted information based on the second key and the identifier associated with the action figure.

3. The method of claim 1, wherein the action figure or action figure accessory comprises an action figure accessory, and the identifier comprises an identifier associated with the action figure accessory, and wherein generating the second encrypted information comprises generating the second encrypted information based on the second key and the identifier associated with the action figure accessory.

4. The method of claim 1, wherein the first key comprises a first private key, and the second key comprises a second private key.

5. The method of claim 1, further comprising:
receiving, at the action figure or action figure accessory, a public key,
wherein generating the second encrypted information comprises generating the second encrypted information based on the second key, the public key, and the identifier.

6. The method of claim 5, further comprising:
generating, by the action figure or action figure accessory, a shared secret based on the public key and a private key associated with a second public key stored at the action figure or action figure accessory,
wherein generating the second encrypted information comprises generating the second encrypted information based on the second key, the shared secret, and the identifier.

7. The method of claim 6, further comprising:
generating, by the action figure or action figure accessory, based on the second key and the shared secret, third encrypted information comprising an encrypted version of the second key; and
providing the third encrypted information to the device via the established wireless connection.

8. The method of claim 1, further comprising:
obtaining, by the action figure or action figure accessory, another identifier associated with another action figure or action figure accessory;
generating, by the action figure or action figure accessory, third encrypted information based on the second key and the other identifier; and
providing, by the action figure or action figure accessory, the third encrypted information to the device via the established wireless connection.

9. The method of claim 8, further comprising:
detecting, by the action figure or action figure accessory, the other action figure or action figure accessory within a short wireless communication range; and
establishing, by the action figure or action figure accessory, based on the detection of the other action figure or action figure accessory, a wireless connection between the action figure or action figure accessory and the other action figure or action figure accessory,
wherein obtaining the other identifier comprises obtaining the other identifier from the other action figure or action figure accessory via the established wireless connection between the action figure or action figure accessory and the other action figure or action figure accessory.

10. An action figure or action figure accessory for providing secured wireless communication, the action figure or action figure accessory comprising:
one or more physical processors programmed to execute computer program instructions which, when executed, cause the one or more physical processors to:
detect a device within a short wireless communication range;
establish, based on the detection, a wireless connection between the action figure or action figure accessory and the device;
obtain a first key;
receive first encrypted information from the device via the established wireless connection, wherein the first encrypted information comprises an encrypted version of a second key;
process the first encrypted information based on the first key to determine the second key;
generate second encrypted information based on the second key and an identifier associated with the action figure or action figure accessory; and
provide the second encrypted information to the device via the established wireless connection.

11. The action figure or action figure accessory of claim 10, wherein the action figure or action figure accessory comprises an action figure, and the identifier comprises an identifier associated with the action figure, and
wherein generating the second encrypted information comprises generating the second encrypted information based on the second key and the identifier associated with the action figure.

12. The action figure or action figure accessory of claim 10, wherein the action figure or action figure accessory comprises an action figure accessory, and the identifier comprises an identifier associated with the action figure accessory, and
wherein generating the second encrypted information comprises generating the second encrypted information based on the second key and the identifier associated with the action figure accessory.

13. The action figure or action figure accessory of claim 10, wherein the first key comprises a first private key, and the second key comprises a second private key.

14. The action figure or action figure accessory of claim 10, further comprising:
receiving, at the action figure or action figure accessory, a public key,
wherein generating the second encrypted information comprises generating the second encrypted information based on the second key, the public key, and the identifier.

15. The action figure or action figure accessory of claim 14, further comprising:
generating, by the action figure or action figure accessory, a shared secret based on the public key and a private key associated with a second public key stored at the action figure or action figure accessory,
wherein generating the second encrypted information comprises generating the second encrypted information based on the second key, the shared secret, and the identifier.

16. A method of providing secured wireless communication with an action figure or action figure accessory, the method being implemented on a computer system that includes one or more physical processors executing computer program instructions which, when executed, perform the method, the method comprising:
providing, by the computer system, a first public key associated with a first private key to an action figure or action figure accessory via a wireless connection between the computer system and the action figure or action figure accessory;
generating, by the computer system, first encrypted information comprising an encrypted version of a second key;
providing, by the computer system, the first encrypted information to the action figure or action figure accessory;

receiving, at the computer system, second encrypted information from the action figure or action figure accessory via the wireless connection;

processing, by the computer system, the second encrypted information based on the first private key and the second key to obtain an identifier associated with the action figure or action figure accessory; and providing, by the computer system, based on the identifier, a presentation of a virtual counterpart of the action figure or action figure accessory in a virtual environment.

17. The method of claim 16, further comprising:

obtaining, by the computer system, a third public key associated with a third private key, wherein the third public key and the third private key are stored at the action figure or action figure accessory; and generating, by the computer system, a shared secret based on the third public key and the first private key associated with the first public key, wherein processing the second encrypted information comprises processing the second encrypted information based on the shared secret and the second key to obtain the identifier.

18. The method of claim 16, wherein the second key comprises a second private key.

19. The method of claim 16, wherein the action figure or action figure accessory comprises an action figure, and the identifier comprises an identifier associated with the action figure, the method further comprising:

obtaining, by the computer system, based on the identifier associated with the action figure, a virtual counterpart of the action figure in the virtual environment, wherein providing the presentation comprises providing a presentation of the virtual counterpart of the action figure.

20. The method of claim 16, wherein the action figure or action figure accessory comprises an action figure accessory, and the identifier comprises an identifier associated with the action figure accessory, the method further comprising:

obtaining, by the computer system, based on the identifier associated with the action figure accessory, a virtual counterpart of the action figure accessory in the virtual environment, wherein providing the presentation comprises providing a presentation of the virtual counterpart of the action figure accessory.

21. A system for providing secured wireless communication with an action figure or action figure accessory, the system comprising:

one or more physical processors programmed with one or more computer program instructions which, when executed, cause the one or more physical processors to:

provide a first public key associated with a first private key to an action figure or action figure accessory via a wireless connection between the computer system and the action figure or action figure accessory;

generate first encrypted information comprising an encrypted version of a second key;

provide the first encrypted information to the action figure or action figure accessory;

receive second encrypted information from the action figure or action figure accessory via the wireless connection;

process the second encrypted information based on the first private key and the second key to obtain an identifier associated with the action figure or action figure accessory; and provide, based on the identifier, a presentation of a virtual counterpart of the action figure or action figure accessory in a virtual environment.

22. The system of claim 21, wherein the one or more physical processors are further caused to:

obtain a third public key associated with a third private key, wherein the third public key and the third private key are stored at the action figure or action figure accessory;

generate a shared secret based on the third public key and the first private key associated with the first public key; and process the second encrypted information based on the shared secret and the second key to obtain the identifier.

23. The system of claim 21, wherein the second key comprises a second private key.

24. The system of claim 21, wherein the action figure or action figure accessory comprises an action figure, and the identifier comprises an identifier associated with the action figure, and wherein the one or more physical processors are further caused to:

obtain, based on the identifier associated with the action figure, a virtual counterpart of the action figure in the virtual environment; and provide a presentation of the virtual counterpart of the action figure.

25. The system of claim 21, wherein the action figure or action figure accessory comprises an action figure accessory, and the identifier comprises an identifier associated with the action figure accessory, and wherein the one or more physical processors are further caused to:

obtain, based on the identifier associated with the action figure accessory, a virtual counterpart of the action figure accessory in the virtual environment; and provide the presentation of the virtual counterpart of the action figure accessory.

* * * * *